Patented Feb. 10, 1931

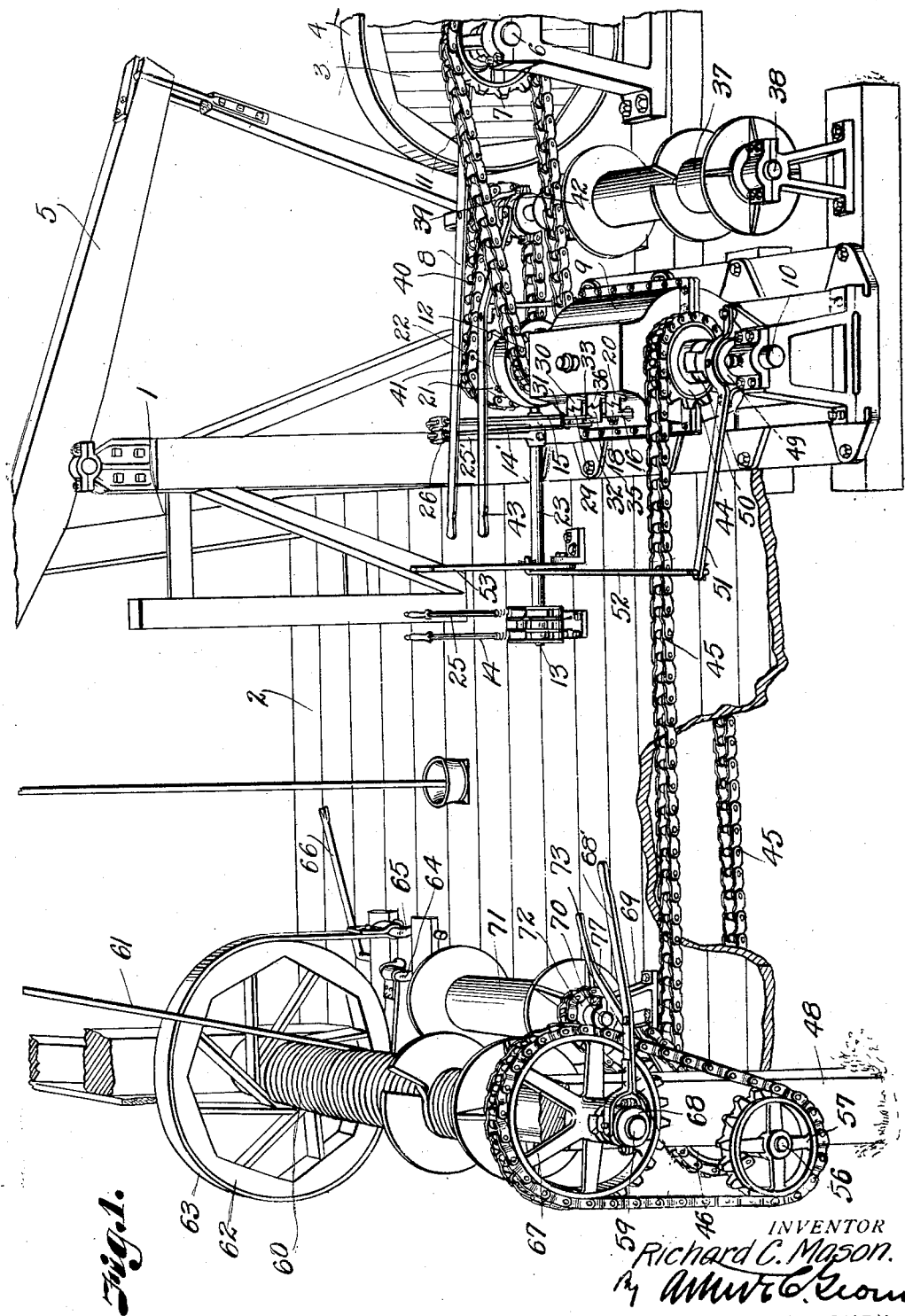

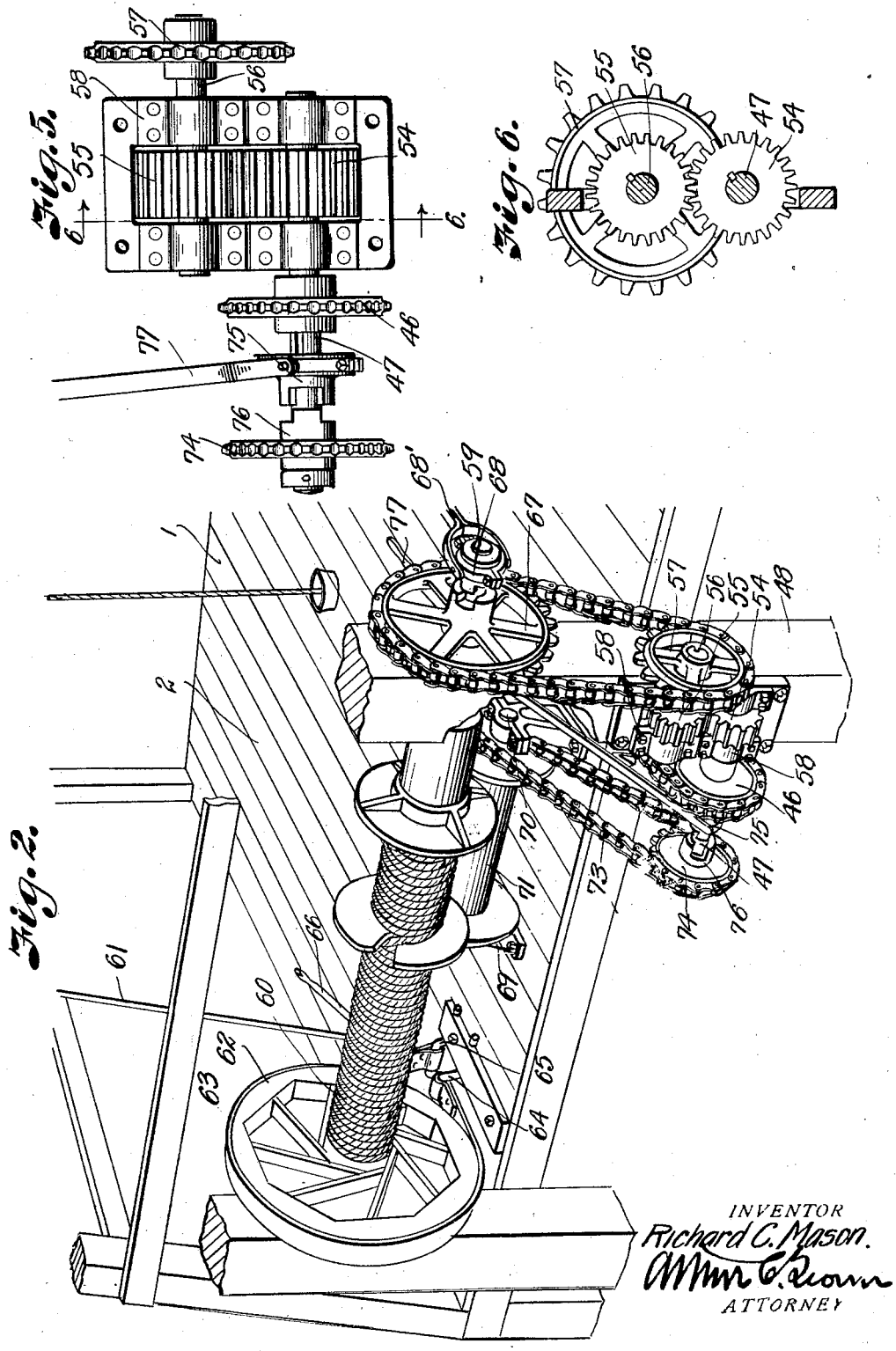

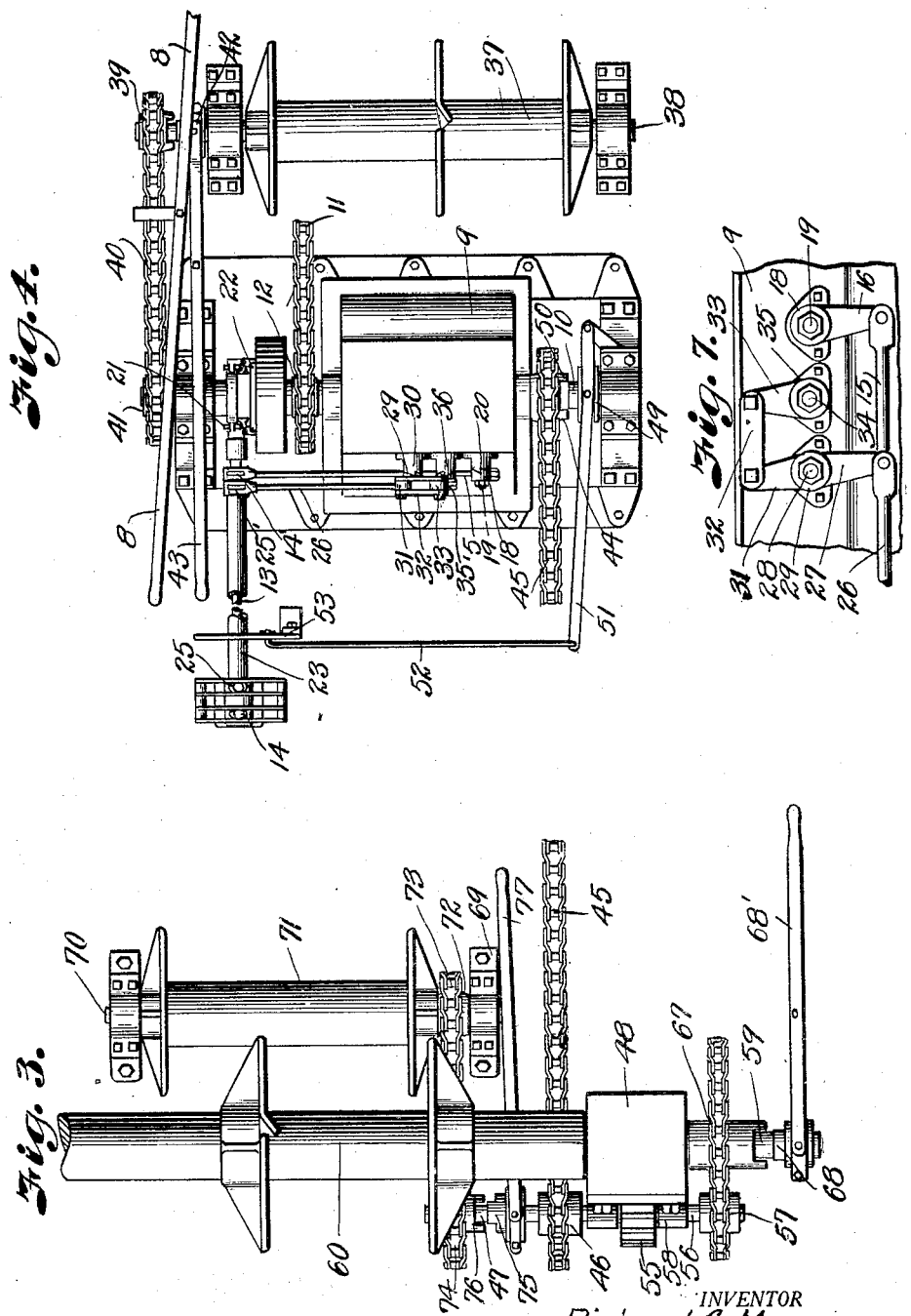

1,792,108

UNITED STATES PATENT OFFICE

RICHARD C. MASON, OF TULSA, OKLAHOMA

WELL-DRILLING MECHANISM

Application filed October 11, 1926. Serial No. 140,809.

My invention relates to well drilling mechanism and more particularly to means of that character for operating the tools of an ordinary standard oil well drill rig, the principal object of the invention being to adapt the type of planetary gear transmission disclosed in the application for patent filed by Matthias A. Beck under date of February 20th, 1926, Serial Number 89,632, which resulted in Patent No. 1,673,795 issued June 19, 1928, for this purpose.

In accomplishing this object I have provided a novel combination of elements and details of structure hereinafter described and illustrated in the accompanying drawings, wherein:

Fig. 1 is a perspective view of a part of a standard drill rig and operative mechanism constructed in accordance with my invention.

Fig. 2 is a perspective view of a part of the same elements taken from a different angle.

Fig. 3 is an enlarged plan view of a part of the bull and calf wheel elements with their power applying mechanism.

Fig. 4 is an enlarged plan view of the transmission and sand reel.

Fig. 5 is an enlarged elevation of the jack shaft and its connections for the bull and calf wheels.

Fig. 6 is an enlarged vertical section on the line 6—6, Fig. 5.

Fig. 7 is a detail perspective view of part of the differential control mechanism.

Referring more in detail to the drawings: 1 designates a part of a derrick of ordinary construction comprising the floor 2. Located adjacent the derrick is the usual band wheel 3 operable from a source of power by a belt 4 and in turn operating the walking beam 5 through crank mechanism as in the usual practice. Rotatable on the band wheel shaft 6 is a sprocket wheel 7 adapted for operative engagement from the band wheel shaft through clutch mechanism indicated by the lever 8 which extends to an operator's position on the derrick floor.

Located adjacent the band wheel is a variable speed transmission mechanism of the type disclosed in the application of Matthias A. Beck aforesaid, to which reference may be made for detail construction of the mechanism.

The transmission 9 comprises a shaft 10 constantly rotatable by the belt 11 which runs over the sprocket wheel on the band wheel shaft and over a sprocket wheel 12 on the transmission shaft. The transmission is controlled from a system of levers and connections comprising an internal shaft 13 journalled in suitable bearings and having an operating lever 14 on the derrick floor. Also fixed to the internal shaft is a lever 14' having link connection 15 with a lever 16 on a cam collar 18 fixed to a rod 19 controlling the brake band of the transmission mechanism and co-operating with a cam 20 on the transmission housing so that when the lever is moved in one direction the brake is applied and when moved in another direction the brake is released.

Also fixed to the shaft 13 is a clutch shifting arm 21 for operating the clutch 22 that connects the driving sprocket 12 with the transmission shaft so that when the lever 14 is shifted further in the direction for relieving the brake, the transmission shaft is connected directly with the power to operate the transmission at high speed.

Rotatable on the shaft 13 is a sleeve 23 carrying a hand lever 25 and a clutch operating lever 25'. The lever 25' is connected through a link 26 with one arm of a lever 27 on a rod 28 journalled in the transmission housing and connected with the low speed gearing in the transmission, the hub of the lever 27 having a cam 29 engageable with a cam 30 on the housing so that when the lever is moved in one direction, the low speed gears are connected, and when moved in the other direction the gears are released.

The lever 27 has a second arm 31 connected by a link 32 with an arm 33 on a rod 34 journalled in the transmission housing and operatively connected with the reverse gearing in the transmission, the hub of the arm 33 having a cam 35, Fig. 7, engageable with a cam 36 on the transmission housing, Figs. 1 and 4, the cams on the reverse gearing elements being arranged oppositely to those on the low speed gear elements so that when the lever 25 is moved in one direction the sleeve is rotated to operate the link 26 and move the lever 27 for operating the cam sets 29—30 and 35—36, and the low gears are released before the reverse gears are connected and vice versa, there being lost motion in one of the cam sets to permit this operation without interference.

Located adjacent the transmission preferably between it and the band wheel is a sand reel 37 of ordinary construction having a shaft 38. Loosely mounted on the shaft 38 and adapted to be keyed thereto by a clutch 42, Fig. 4, is a sprocket wheel 39 carrying a chain belt 40 which is run over a sprocket wheel 41 on an extension of the transmission shaft so that the sand reel sprocket is constantly rotated when the transmission is acting.

42 designates a clutch, splined to the sand reel shaft and operable by a lever 43 which extends to the operator's position on the derrick floor so that the operator controlling the transmission and band wheel may have control of the sand reel without leaving his position.

Rotatable on the transmission shaft 10 is a sprocket wheel 44 having chain belt 45 run thereover and extended beneath the derrick floor to a sprocket wheel 46 on a jack shaft 47 journalled in bearings on one of the derrick posts 48. Splined on the transmission shaft 10 is a clutch member 49 adapted for co-operation with a clutch member 50 on the sprocket 44 to lock the sprocket to the transmission shaft, the spline clutch member being under control of a lever 51 connected by a link 52 with a hand lever 53 located adjacent the transmission, the band wheel and the sand reel controlling levers.

The jack shaft 47 carries a pinion 54 meshing with a pinion 55 on a counter-shaft 56 which extends beyond a vertical face of the post 48 and carries a fixed sprocket wheel 57. The shafts 47 and 56 are journaled in bearings 58 in said post 48, and spaced therefrom, is a bull wheel shaft 59 journaled in the posts 48 and carrying a bull wheel 60 of ordinary construction upon which a cable 61 is wound as in ordinary practice, the bull wheel shaft being provided with a brake wheel 62 carrying a brake band 63, the ends of which are attached to cranks 64 and 65 journalled in suitable bearings on the derrick floor and one of them operable by hand lever 66. The bull wheel shaft carries a loose sprocket wheel 67 having a clutch jaw engageable by the jaw of a clutch member 68 splined on the shaft and operable by a lever 68' extending over the derrick floor.

Journalled in standard bearings 69 on the derrick floor adjacent the bull wheel is the shaft 70 of a calf wheel 71. The calf wheel shaft carries a fixed sprocket wheel 72 having a chain belt 73 run thereover and over a sprocket wheel 74 loose on the jack shaft 47.

Splined on the jack shaft is a clutch member 75 adapted for co-operation with a clutch member 76 on the sprocket wheel 74 under control of a lever 77 extending to and over the derrick floor.

With the parts constructed and assembled as described, the drilling operation is performed in the usual manner, the walking beam being operated from the band wheel shaft as in ordinary practice, the cable suspending the tools being connected with a bull wheel.

When the tools are to be pulled, the cable is disconnected from the walking beam, the transmission connected with the band wheel through the clutch mechanism on the band wheel shaft and the jack shaft at the rear of the derrick operatively connected with the transmission through the clutch mechanism controlled by the lever 53 and the clutch on the bull wheel shaft. The bull wheel is then operated through the transmission to wind the cable and pull the tools. When the tools are out of the well, they may be let down onto the derrick floor by reversing the transmission or held suspended by application of the bull wheel brake. When they are to be again let into the well the rope is permitted to unwind under control of the bull wheel brake, the transmission remaining in neutral.

The same operation takes place when the well casing is pulled. For pulling rods or tubing, a cable on the calf wheel is employed, the calf wheel being rotated to wind the cable through its connection with the jack shaft under control of the lever 77.

The sand reel is similarly employed for bailing, connection between the sand reel and transmission being controlled through the clutch mechanism operable by the lever 43.

It is apparent, therefore, that I have provided a simple, compact assembly of operating mechanisms for the several elements of the drill outfit and that all of the elements may be individually controlled from a derrick floor, and at different speeds, it being apparent that operation of the bull wheel carrying the heavy tools or casing may be operated at low speed but high power, whereas the calf wheel and sand reel carrying the light load and requiring less power may be operated at relatively high speeds, and that this variation in power and speed may be effected through the single transmission mechanism and the changes accomplished from a single control position without requiring the operator to leave the derrick floor.

It is further apparent that this variation in speed and reverse operation of the parts may be effected from the ordinary gas engine without reverse of the flow of power from the prime mover.

What I claim and desire to secure by Letters Patent is:

In apparatus of the character described including a derrick including posts, a band wheel and a planetary gear speed change transmission, a bull wheel supported by the derrick posts, a calf wheel located against the bull wheel, bearings mounted on one of said bull wheel supporting derrick posts, a jack shaft mounted in one of said bearings and projecting from one side of said post, a counter shaft mounted in the other bearing and extending oppositely from said post, a clutch controlled connection between the transmission and the jack shaft for rotating the jack shaft in the same direction as the transmission, a clutch connection between the jack shaft and the calf wheel for rotating the calf wheel in the same direction as the transmission, meshed gears on the jack shaft and counter shaft for rotating the counter shaft oppositely to the jack shaft, and a clutch controlled connection between the counter shaft and the bull wheel for driving the bull wheel from the counter shaft in reverse direction to the rotation of the jack shaft.

In testimony whereof I affix my signature.
RICHARD C. MASON.